July 3, 1962 R. O. HEISEL 3,041,800

APPARATUS FOR SHAPING CRYSTALS

Filed May 4, 1960 2 Sheets-Sheet 1

INVENTOR.
ROY O. HEISEL
BY Lothrop & West
ATTORNEYS

July 3, 1962 R. O. HEISEL 3,041,800

APPARATUS FOR SHAPING CRYSTALS

Filed May 4, 1960 2 Sheets-Sheet 2

INVENTOR.
ROY O. HEISEL

BY Lothrop & West

ATTORNEYS 3,041,800
APPARATUS FOR SHAPING CRYSTALS
Roy O. Heisel, P.O. Box 371, Florin, Calif.
Filed May 4, 1960, Ser. No. 26,777
4 Claims. (Cl. 51—277)

This invention relates to apparatus for shaping crystals, and more particularly for forming parallel planar faces on quartz crystals used in the field of electronics.

It is an object of the invention to provide an apparatus to form parallel planar faces on a crystal, the apparatus being simple and especially effective in the production of ultra-precision finished crystals of high quality and fine dimensional tolerance suitable for use in piezo-electric crystal oscillators, the apparatus being inexpensive and uncomplicated to use.

It is another object of the invention to provide an apparatus for forming and polishing parallel planar faces on a crystal and for the production of surfaces of optical smoothness and flatness and of ultra high parallelism and dimensional thickness qualities.

It is still another object of the invention to provide a generally improved apparatus for shaping crystals.

Other objects together with the foregoing are attained in the embodiment described in the following description and shown in the accompanying drawings in which.

Figures 1, 2, 3, 4:
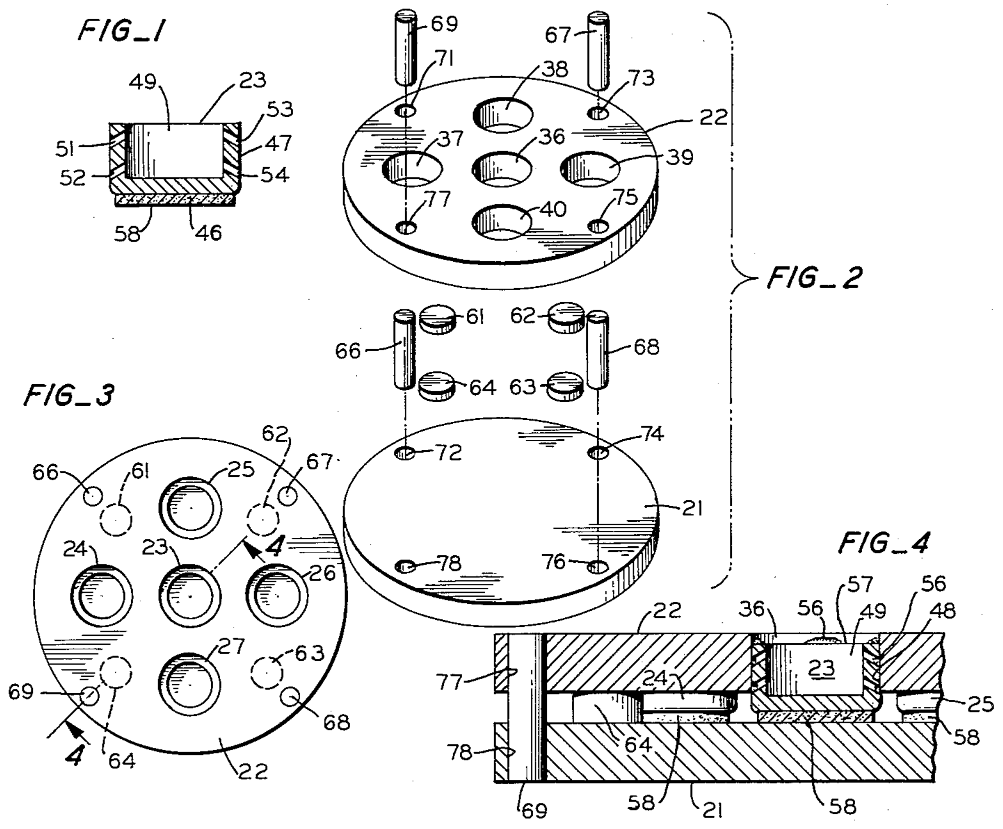
FIGURE 1 is a cross-sectional elevational view of a portion of the apparatus used in the process of the invention, showing a step in the process.
FIGURE 2 is an exploded perpective view, on a reduced scale, of other portions of the apparatus.
FIGURE 3 is a plan view of the apparatus in assembled condition, illustrating a further step of the process.
FIGURE 4 is a fragmentary cross-sectional view, to an enlarged scale, of the apparatus shown in FIGURE 3, the plane of section being indcated by the line 4—4 in FIGURE 3, the view illustrating a further step of the process.

While the process and apparatus of my invention are susceptible of numerous embodiments depending on the particular environment and requirements of use, a considerable number of the apparatus elements have been made and used repeatedly to perform the process of the invention in a most satisfactory way.

The apparatus of the invention includes a first plate 21 and a second plate 22, each having parallel opposite planar faces formed to optical flatness and smoothness. The plate 22 cooperates with crystal holding means, here shown as including a plug member 23 or plug (see FIGURE 1). A plurality of plugs 23, 24, 25, 26 and 27 may be provided, each for holding one crystal 31, 32, 33, etc., respectively (see FIGURE 7). It will be understood that the apparatus described is suitable for the concurrent processing of a number of crystals, but to simplify the description, only the crystal 31 and the plug 23 will be referred to, except when a step of the process can be better described by reference to another plug and crystal.

The plug member 23 is adjustable for selective positioning with respect to the plane of the plate 22, and fits within a transverse or vertical bore 36 (bores 37, 38, 39 and 40 being provided for the other plugs) formed in the plate 22 for axial motion therethrough. The plug member 23 presents a planar end face 46 aligned in parallel relation to the plate 22 for engaging and holding the crystal. The plug member is further formed as a cup-like member having cylindrical outer side walls 47 engaging the inner surface 48 of the bore 36 and defining, with the end represented by the face 46, a cavity 49 opening oppositely to the face 46. The side walls 47 are provided with a plurality of inclined bores 51, 52, 53 and 54, etc., diverging radially outwardly and downwardly as appears most clearly in FIGURES 1 and 4.

The plug may be affixed in position in the bore 36 as by applying adhesive such as liquid water glass 56 (see FIGURE 4) to exposed adjacent surfaces of the plug and the plate, particularly to the upper rim 57 of the plug, to the adjacent surface of the bore 36, and to the interiors of the bores 51—54, so that the water glass runs down these inclined bores and contiguously wets the interior walls of these bores and the adjacent surface of the bore 36. When the water glass dries, a fast bond is formed between the plug and the plate, holding the two members securely and precisely in whatever relative positions they were selectively adjusted to.

The plug member 23 is ordinarily prepared for use by the following preliminary part of the process: first, the face 46 is smeared with liquid water glass and is covered with a layer 58 of lens paper (FIGURE 1), which is smoothed on so that the water glass impregnates the paper. The assembly is then dried, with the water glass forming an adhesive bond between the impregnated paper and the face 46.

The plates 21 and 22 are thereupon aligned in spaced parallel relation (FIGURE 4) as by the application of spacing means here shown as a plurality of spacers 61, 62, 63 and 64, all of the spacers being of precisely equal dimensional thickness and presenting opposite parallel planar faces of optical flatness and smoothness. Alignment pins 66, 67, 68 and 69 are then inserted through registering bores 71—72, 73—74, 75—76 and 77—78 formed in the plates to maintain them in fixed lateral and rotational alignment.

The plug member 23 is then inserted through the bore 36 until the paper layer 58 comes into face-to-face engagement with the plate 21, so as to be aligned in parallel relation with plate 22 (the plates being parallel). Water glass 56 is next applied to adjacent portions of the plug and the plate and dried (for about 15 minutes), as previously described, to fix these members in their adjusted relative positions. The plate 22 and the plug 23 are then removed in assembled relation and the plate is mounted in a lapping machine 91 (FIGURE 5); and the paper 58 is lapped, preferably to a residual thickness of approximately .001 inch, and leaving an exposed paper surface that is smooth and flat and rigorously parallel to the plate 22. The water glass 56 holding the plug and the plate together is then dissolved and the plug is removed from the plate.

Figure 6:
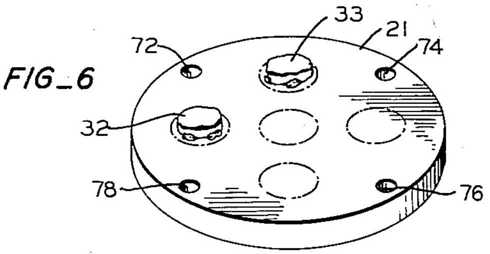
FIGURE 6 is a perspective view to a reduced scale of a portion of the apparatus shown in FIGURES 2–4 with crystals mounted thereon and illustrating a further step of the process.
Figure 7:
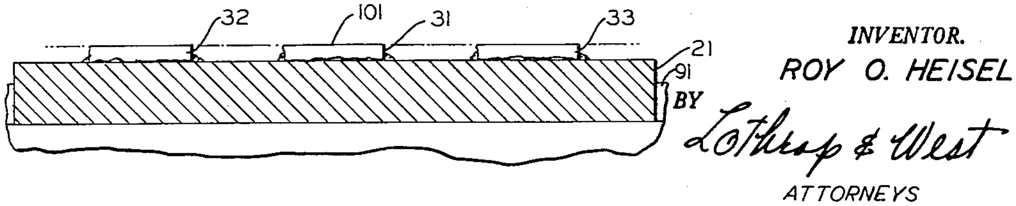
FIGURE 7 is a cross-sectional elevational view, to an enlarged scale, of the assembly shown in FIGURE 6 mounted in a lapping machine and illustrating a further step in the process.

The plates are thereupon assembled in face-to-face relation and aligned with the pins 66—69. The circular outline of the bore 36 (along with the other bore) is then scribed on the surface of the plate 21, as shown by the broken lines of FIGURE 6. The plates are next separated and the rough crystal 31 (along with the other crystals) is mounted by means of spots of water glass within the scribed outline on the plate 21 (as shown for crystals 32 and 33 in FIGURE 6). The plate 21 is then mounted in the lapping machine 91, as shown in FIGURE 7, and the crystal is lapped to form a first planar face 101 parallel to the plate 21. This lapping operation may be made as a first lap grind with No. 300 American Optical emery powder followed with machine oil to smooth the surface 101. The plate 21 is then removed from the lapping machine 91 and the crystal is cleaned of oil and emery powder, preferably with acetone.

Figure 8:
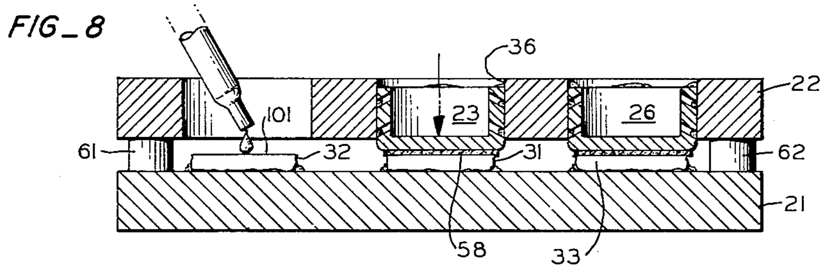
FIGURE 8 is a cross-sectional elevational view of the apparatus of the invention assembled and illustrating a further step of the process.

The plates are then re-aligned in spaced parallel relation, as by means of the spacers 61—64 and the pins 66—69, as shown in FIGURE 8, and with the crystal registered beneath the bore 36 and spaced from the plate 22 as shown at the left-hand side of FIGURE 8. Water is then applied to the surface 101 of the crystal, as illustrated in the left-hand end of FIGURE 8, as by a dropper. The plug member is thereupon inserted in the bore 36 of the plate 22 and adjusted to engage the paper-covered face flatly against the wetted face 101 of the crystal (as illustrated for the plug 23 and the crystal 31 in FIGURE 8), and is pressed into tight contact so that the water softens the water glass impregnating the paper 58. The water glass is then dried for about fifteen minutes to cause the plug to adhere to the face 101 of the crystal.

The plate-alignment step, the water application step, and the insertion of the plug member in the plate 22 may all be performed substantially concurrently, i.e., either just before or just after one another and in any order, without departing from the spirit of the invention.

Substantially concurrently with the drying step (i.e., at any time after the plug is engaged with the crystal or during or just after the drying step), further water glass is applied to adjacent exposed surfaces of the plug and plate 22 in the manner previously described, and dried for about fifteen minutes to cause these members to adhere together (as illustrated for the plug member designated by the numeral 26 in FIGURE 8).

Figure 9:
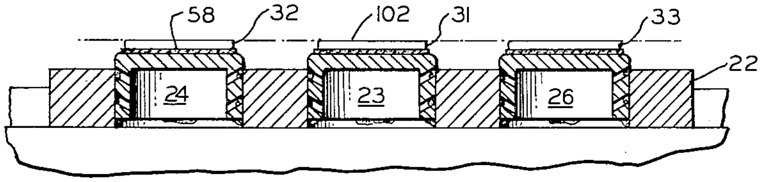
FIGURE 9 is a cross-sectional elevational view of a portion of the assembly shown in FIGURE 8 mounted in a lapping machine and illustrating a further step of the process.

The assembly is then immersed in water sufficiently far to cover the lower plate 21 but not the crystal, and is kept in the water for about twenty minutes to dissolve the water glass between the crystal and the plate 21 and to permit separation of the crystal and the lower plate 21. The plate 22, with the plug and crystal attached, is then turned upside down and mounted in the lapping machine 91 (FIGURE 9), and the crystal is lapped to remove any chipped portions that may exist around the edges, and to form a second planar face 102 precisely parallel to the plate 22.

It will now be seen that the face 102 of the crystal is accurately parallel to the face 101 of the crystal. The face 101 was lapped parallel to the plate 21 (FIGURE 7); the plate 22 was aligned parallel to the plate 21 (FIGURE 8); and the face 102 was lapped parallel to the plate 22.

With the attainment of such parallelism between the faces of the crystal, a major object of the process is at least roughly accomplished, but the process may be continued and the steps already recited may be repeated in a second cycle in order to bring the characteristics of parallelism, dimensional thickness and smoothness of the finished crystal within an even finer range of tolerance.

Specifically, the crystal may be removed from the plate 22 and re-mounted on the plate 22 with the other face (face 101) exposed for a third lapping and polishing operation (the second operation for this face), the final lapping operation for each face terminating in a step of polishing the face to optical smoothness, and the first face to be polished being subjected to an immediately following step of coating with protective material, since the first face to be polished must be brought into contact with the plate 22 when the crystal is mounted for subsequent polishing of the last face to be polished.

When such a second cycle is to be undertaken, the lapping operation for face 102 (FIGURE 9), with which the first cycle ended, also includes polishing the face 102 to optical flatness and smoothness. The crystal is then removed from plate 22 and from the plug as by submerging the crystal, plate and plug assembly in water for about ten hours to dissolve all the water glass holding these elements together, separating them, and preparing the plug with a new layer of water-glass-impregnated lens paper was previously described. The preparation of the new plug may be performed substantially concurrently with any of these steps: for example, an entirely different plug may be prepared in advance, or during the dissolving step for separating the plate 22 and crystal, or immediately following, so long as a prepared plug is ready for the steps now to be described. Also substantially concurrently with these steps may be performed a step of coating face 102 of the crystal with protective material, i.e., the face 102 may be coated while the crystal is still mounted on the plate 22, or after separation from the plate, and either before or after the preparation of the new plug, but the coating step is preferably performed after the crystal is separated from plate 22, since otherwise special efforts might be needed to avoid having the plate 22 coated at the same time.

Figure 10:
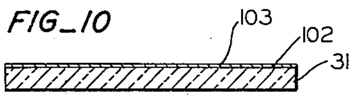
FIGURE 10 is a cross-sectional elevational view to an enlarged scale of one of the crystals shown in FIGURE 9 and illustrating a further step of the process.

A preferred way to coat the crystal face 102 is first to clean the crystal in water and detergent and place it in a bell jar with the face 102 exposed, the face being given a flash of vaporized copper 103 to a uniform thickness of approximately three millionths of an inch, as illustrated in FIGURE 10.

Figure 11:
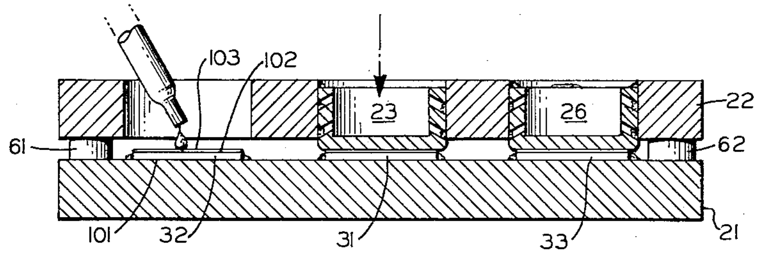
FIGURE 11 is a cross-sectional elevational view of the apparatus assembled with a number of the crystals of FIGURE 10 and illustrating a further step of the process.
Figure 12:
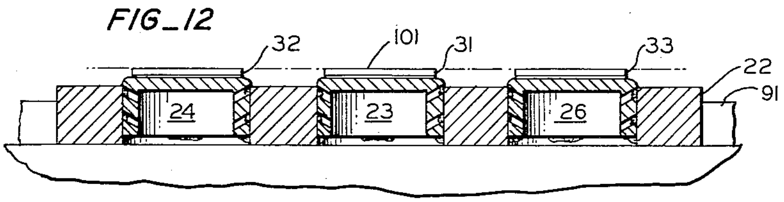
FIGURE 12 is a cross-sectional elevational view of a portion of the assembly of FIGURE 11 mounted in a lapping machine and illustrating a further step of the process.

The crystal is then placed in the scribed outline on plate 21, as illustrated in FIGURE 7, but with the coated face 102 exposed and the face 101 in contact with the plate, as illustrated in FIGURE 11. The crystal is affixed to the plate as by the application of water glass at the perimeter of face 101, and the water glass is dried.

The plates are then assembled in spaced parallel relation using the spacers 61—64 and the pins 66—69 as previously described, and as illustrated in FIGURE 11. Water is applied, as by a dropper, to coated face 102 as illustrated for crystal 32 (i.e., at the left-hand end of FIGURE 11) and substantially concurrently the plug is inserted in the bore of the plate 22. The plug is then engaged with the crystal face 102 as illustrated by the (central) plug 23 and crystal 31 of FIGURE 11. The wetted water glass in the paper is allowed to dry substantially concurrently with the step of applying water glass to the plug and the plate 22 and drying same, as illustrated for plug 26 and the plate in FIGURE 11. When the water glass is dry, the plate 22 with the plug and crystal affixed and with the crystal face 101 exposed, is removed from the assembly by dissolving the water glass holding the crystal and the lower plate 21 together and mounted in lapping machine 91. The face 101 is then lapped to the required thickness of the crystal and polished optically flat and smooth. The crystal may then be demounted from the plate 22 by dissolving the water glass. The protective coating on face 102 may be either left on or removed by applying a solvent.

Figure 5:
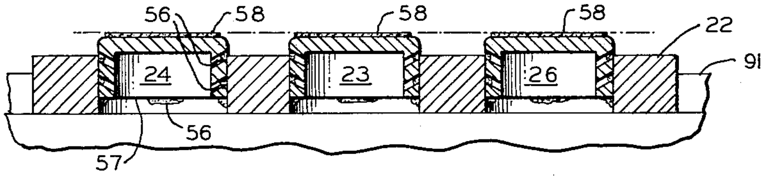
FIGURE 5 is a cross-sectional elevational view of a portion of the apparatus shown in FIGURE 4 mounted in a lapping machine and illustrating a further step of the process.

It is to be recognized that while the preliminary process of applying lens paper to the bottom of the plug, as appears most clearly in FIGURES 4 and 5, yields a very satisfactory result, that the use of said paper is not absolutely essential; and that for certain types of crystals, and for greater simplicity, the crystal can be applied directly to the face of the plug, water glass being used to cause the crystal to adhere to the plug face.

What is claimed is:

1. An apparatus for use in forming a pair of parallel planar faces on a crystal, said apparatus comprising: first and second plates, said second plate including a transverse bore; a crystal-holding plug member fitting in said bore for axial movement therethrough and presenting a planar end face aligned in parallel relation with said second plate for engaging and holding said crystal, said plug member being cup-shaped and including side walls outwardly engaging the inner surface of said bore, said side walls being formed with a plurality of inclined openings; adhesive material affixed to said inner surface of said bore and disposed in said inclined openings for securing said plug member in said bore; and means for spacing said plates apart in parallel relation.

2. An apparatus for use in forming a pair of parallel planar sides on a crystal, said apparatus comprising: a first plate having an optically flat first surface; a second plate having a flat second surface, said second plate including a bore at right angles to said second surface; a plug having circular cylindrical side walls fitting within said bore and including an end face at right angles to said side walls; means for accurately spacing apart said first and said second surfaces in parallel facing relation; means for securing said plug in said bore with said end face of said plug in face to face engagement with one side of a crystal, the other side of the crystal being in face to face engagement with said first surface; and means for selectively affixing said other side of said crystal to said first surface and said one side of said crystal to said end face.

3. The apparatus of claim 2 further characterized by means for selectively detaching said other side of said crystal from said first surface and said one side of said crystal from said end face of said plug.

4. The apparatus of claim 3 wherein said second surface is optically flat, and wherein said spacing means includes a plurality of spacers of equal length and each having opposite parallel planar faces of optical flatness and smoothness.

References Cited in the file of this patent

UNITED STATES PATENTS

| | | |
|---|---|---|
| 2,539,561 | Wolfskill | Jan. 30, 1951 |
| 2,722,089 | Boettcher | Nov. 1, 1955 |